G. RENNERFELT.
THRUST BEARING.
APPLICATION FILED SEPT. 26, 1907.
914,075.
Patented Mar. 2, 1909.
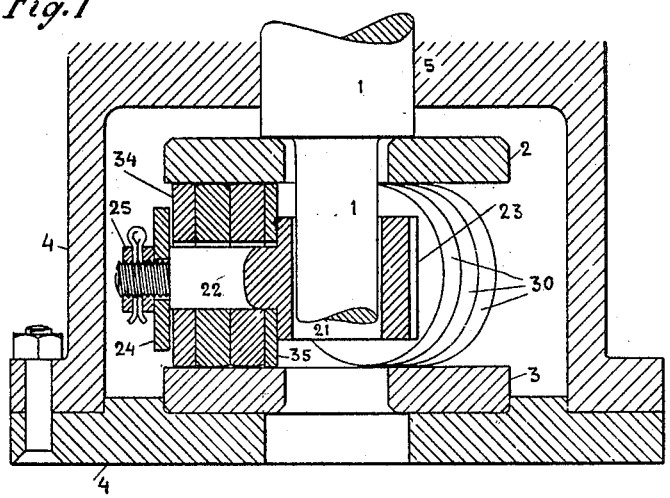
Fig. 1
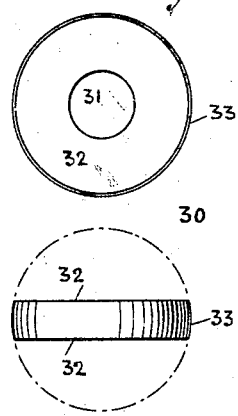
Fig. 3
Fig. 4
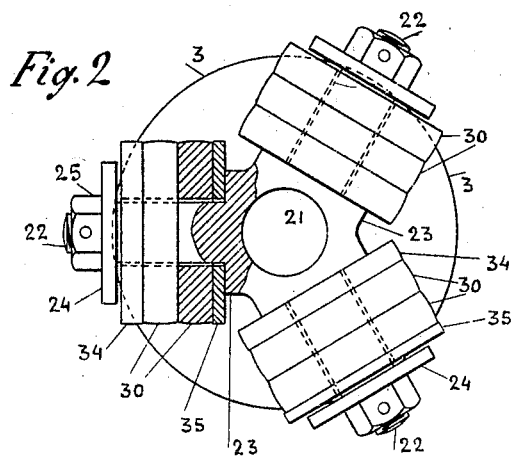
Fig. 2
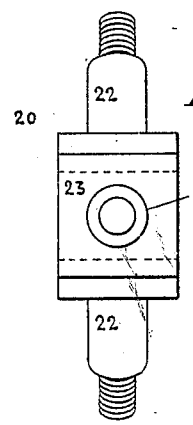
Fig. 5
WITNESSES
INVENTOR
Gustaf Rennerfelt

UNITED STATES PATENT OFFICE.

GUSTAF RENNERFELT, OF SCRANTON, PENNSYLVANIA.

THRUST-BEARING.

No. 914,075.  Specification of Letters Patent.  Patented March 2, 1909.

Application filed September 26, 1907. Serial No. 394,716.

*To all whom it may concern:*

Be it known that I, GUSTAF RENNERFELT, a subject of the King of Sweden, and a resident of Scranton, in the county of Lackawanna and State of Pennsylvania, United States of America, have invented certain new and useful Improvements in Thrust-Bearings, of which the following is a specification.

My invention relates to improvements in thrust bearings of the type in which balls or rollers are used for sustaining the thrust, and its object is to provide a bearing of this class which is simple and cheap in construction and efficient in operation.

I will describe my invention in the following specification and point out the novel features thereof in claims.

Referring to the drawing, Figure 1 is a sectional side elevation of a thrust bearing constructed according to my invention. Fig. 2 is an end view partly in section of the same bearing. Fig. 3 is an end view and Fig. 4 a side view of a detail of the bearing referred to in the specification as a roller. Fig. 5 is a side view of a detail referred to in the specification as a spider.

Like characters of reference designate corresponding parts in all of the figures.

1 designates a shaft to which my bearing is applied, arranged to be rotated and to receive pressure in axial direction.

2 designates a disk, preferably made of hard material, abutting against a shoulder on the shaft, and arranged to rotate therewith.

3 designates a stationary disk of hard material; this disk may be held in a casing 4 constructed so as to form a bearing 5 for guiding the shaft laterally. The disk 3 serves to sustain pressure transmitted from the shaft 1 through disk 2 and through rollers interposed between the two disks.

20 designates a spider comprising a central hub 21, and a plurality of studs 22, 22, 22 extending radially from the hub and preferably formed integrally therewith. The hub 21 of the spider is provided with a plurality of bosses, 23, 23, 23 finished at right angles to the center lines of the studs. A plate 24 is fastened against a shoulder on the end of each stud by means such as the nut 25 threaded upon the end of the stud. A portion of the shaft 1 extends through a hole in the disk 2 into the hub 21, and serves as means to prevent undue lateral displacement of the spider relatively to the shaft.

30, 30, 30 designate a plurality of rollers of hard material and of substantially equal lengths, provided with centrally located holes 31 and mounted loosely upon each of the studs 22 between the boss 23 and the plate 24, said boss and plate serving to prevent undue lateral displacement of the rollers relatively to the spider, the diameter of the hole 31 being substantially greater than the diameter of the stud 22. Each one of the rollers is so constructed as to form an equatorial section of a sphere with flat and parallel end surfaces; this is clearly illustrated in Figs. 3 and 4 where 32, 32 designate the flat ends, and 33 the spherical face of a roller 30. The rollers 30 are all of the same diameter, and are interposed between the flat disks 2 and 3 so that each spherical roller 30 makes a point contact with each disk, the pressures from the two disks being directed oppositely through the center of the roller. In order to obtain many points of contact I use in the bearing a great number of the rollers, and I prefer to make the rollers of short length, so that the plurality of rollers mounted on each stud shall not occupy much space in radial direction, and the complete bearing—although containing many rollers—will be of relatively small diameter.

34, 34 and 35, 35 designate washers or auxiliary rollers mounted as shown in Figs. 1 and 2 upon two of the three studs, and of lengths different from the length of a roller 30. By means of these washers of suitable length the rollers mounted on one of the studs are staggered relatively to the rollers mounted on any of the other studs, so that all the rollers in the bearing are located at different distances from the center of the hub. The path of any one roller in its movement on a disk will therefore not coincide with the path of any other roller, and the pressure and wear on the disk will be fairly uniformly distributed over the surface of the disks. The washers are preferably made with spherical faces, and of the same diameter as the rollers 30.

When conditions so admit I prefer to make the rollers of fairly large diameter, enabling each roller to support high pressure without being overstrained. The form of the rollers is such that they can be produced of any size at a relatively small cost; the spherical rollers 30 are in this respect different from the balls commonly employed in thrust bearings as made heretofore, which balls cannot be produced of large diameter except at a very high cost.

A bearing made according to my invention has the advantages and the efficiency of a ball bearing with a great number of very large balls. Such a bearing would be expensive to construct and cumbersome in size, shape and appearance. By my improved construction, however, the bearing may be inclosed within a small space, and the thrust pressures put upon it taken up by surfaces near the axis of the shaft with which it coacts.

In thrust bearings arranged for large shafts or for very high pressure I prefer to use a great number of the studs 22, but for moderate pressures and where conditions will so permit, I prefer to employ only three studs, as shown in the drawing.

What I claim is:

1. In a thrust bearing, the combination of a spider comprising a plurality of bosses, a stud extending from each of the bosses, a spherical roller having a hole through its center mounted on each stud, said hole being substantially greater than the diameter of the stud, and a plate fastened to the end of the stud; said boss and plate being arranged to prevent undue lateral displacement of the roller and the rollers arranged to sustain all the load on the bearing, the diameter of each of said rollers being greater than its length.

2. In a thrust bearing, the combination of a spider comprising a plurality of bosses, a stud formed integrally with the spider extending from each of the bosses, a spherical roller having a hole through its center mounted on each stud, said hole being substantially greater than the diameter of the stud, and a plate fastened to the end of the stud; said bosses and plates being arranged to prevent undue lateral displacement of the rollers.

3. In a thrust bearing, the combination of a spider comprising a plurality of bosses, a stud extending from each of the bosses, said stud having a shoulder at its end, a plate fastened to the stud against said shoulder and a spherical roller mounted with clearance on each stud between the boss and the plate, said boss and plate being arranged to prevent undue lateral displacement of the roller, and the rollers arranged to sustain all the load on the bearing, the diameter of each of said rollers being greater than its length.

4. In a thrust bearing, the combination of a spider comprising a plurality of bosses, a stud extending from each of the bosses, said stud having a shoulder at its end, a spherical roller having a hole through its center and mounted on each stud, said hole being substantially greater than the diameter of the stud; a plate fastened to the stud against said shoulder and a nut threaded at the end of the stud, said boss and plate being arranged to prevent undue lateral displacement of the roller and the rollers arranged to sustain all the load on the bearing, the diameter of each of said rollers being greater than its length.

5. In a thrust bearing, the combination of a hub having a plurality of bosses, a stud extending at right-angles from each one of the bosses, a plate fastened to the end of each stud, and a plurality of rollers having spherical faces mounted on each stud between the boss and the plate.

6. In a thrust bearing, the combination of a hub, a stud extending from the hub, a plurality of rollers of different lengths mounted on the stud, and two disks in contact with the faces of the rollers.

7. In a thrust bearing, the combination of a hub, a stud extending from the hub, a plate fastened to the stud, a plurality of rollers of different lengths mounted on the stud, and two disks in contact with the faces of the rollers.

8. In a thrust bearing, the combination of a central hub, three studs extending radially from the hub, a plurality of rollers having spherical faces mounted on each of the studs, a plate fastened to the end of each stud, and two flat disks in contact with the faces of the rollers.

9. In a thrust bearing, the combination of a central hub, a plurality of studs extending radially from the hub, a plurality of rollers of different lengths mounted on each stud, said rollers having flat ends and spherical faces, a plate fastened to the end of each stud, and two flat disks in contact with the faces of the rollers.

10. A thrust bearing comprising a plurality of radially disposed studs, a plurality of spherically-faced flat rollers mounted upon each of said studs, each of said rollers being at a different distance from a central axis, a disk arranged to transmit pressure to the rollers, and a disk arranged to sustain the pressure.

11. A thrust bearing comprising three equally spaced radially disposed studs extending at right-angles from a central axis, a plurality of spherically-faced flat rollers mounted upon each of said studs, each of said rollers being maintained at a different distance from said central axis, a flat faced disk arranged to transmit pressure to the rollers, and a flat faced disk arranged to sustain the pressure.

12. A thrust bearing comprising three equally spaced radially disposed studs extending at right-angles from a central axis, a plurality of spherically-faced flat rollers of different lengths mounted upon each of said studs, each of said rollers being maintained at a different distance from said central axis, a flat faced disk arranged to transmit pressure to the rollers, and a flat faced disk arranged to sustain the pressure.

13. In a thrust bearing, the combination of a hub, a plurality of studs extending radially from the hub, a plurality of separate rollers mounted upon each one of the studs, said rollers having flat ends and spherical faces, a disk arranged to transmit pressure to the rollers, and a disk arranged to sustain the pressure.

14. In a thrust bearing, the combination of a hub having a plurality of bosses, a stud extending at right-angles from each one of the bosses, a plurality of separate rollers having flat ends and spherical faces mounted on each stud, and two disks in contact with the faces of the rollers.

15. In a thrust bearing, the combination of a hub having a plurality of bosses, a stud extending at right-angles from each one of the bosses, a plate fastened to the end of each stud and a spherical roller having flat ends mounted on each stud, between the boss and the plate, and two disks in contact with the faces of the rollers.

16. In a thrust bearing, the combination of a shaft, a flat-faced disk arranged to rotate therewith, a stationary flat-faced disk, a plurality of rollers of equal diameter each forming an equatorial section of a sphere interposed between the flat faces of the disks and arranged to sustain all the load on the bearing, and means for holding each of the rollers at a different fixed distance from the axis of the shaft.

17. In a thrust bearing the combination of a spider comprising a hub and a plurality of studs extending therefrom, a spherical roller having a hole through its center mounted on each stud, and a plate fastened to the end of the stud, the distance between the hub and the plate being substantially greater than the length of the roller; said hub and plate being arranged to prevent undue lateral displacement of the roller, and the rollers arranged to sustain all the load on the bearing.

In testimony whereof I have hereunto signed my name to this specification, in the presence of two subscribing witnesses.

GUSTAF RENNERFELT

Witnesses:
VERNA HALLOCK,
A. W. BROADBENT.